(12) United States Patent
Costanzo et al.

(10) Patent No.: US 9,344,298 B2
(45) Date of Patent: May 17, 2016

(54) SYSTEM AND METHOD FOR MANAGING ACCESS TO SERVICES OF AN ACCOUNT FOR AN ELECTRONIC COMMUNICATION DEVICE

(75) Inventors: Rito Natale Costanzo, Waterloo (CA); Mihal Lazaridis, Waterloo (CA)

(73) Assignee: BlackBerry Limited, Waterloo, ON (CA)

( * ) Notice: Subject to any disclaimer, the term of this patent is extended or adjusted under 35 U.S.C. 154(b) by 2672 days.

(21) Appl. No.: 11/944,446

(22) Filed: Nov. 22, 2007

(65) Prior Publication Data
US 2009/0137225 A1    May 28, 2009

(51) Int. Cl.
  *H04M 11/00*   (2006.01)
  *H04L 12/66*   (2006.01)
  *H04W 4/22*    (2009.01)
  *H04M 1/725*   (2006.01)
  *H04W 76/00*   (2009.01)

(52) U.S. Cl.
  CPC .................. *H04L 12/66* (2013.01); *H04W 4/22* (2013.01); *H04M 1/72538* (2013.01); *H04W 76/007* (2013.01)

(58) Field of Classification Search
  CPC ..... H04W 4/22; H04W 76/007; H04W 12/06; H04W 76/02; H04W 88/06; G06F 21/34; G06F 21/42; G06F 21/6245; G06F 21/00; H04M 2242/04; H04M 1/72538; H04M 2203/205; H04M 2207/18
  See application file for complete search history.

(56) References Cited

U.S. PATENT DOCUMENTS

| | | | | |
|---|---|---|---|---|
| 7,069,329 | B2* | 6/2006 | Smith | 709/227 |
| 7,450,932 | B2* | 11/2008 | Yabe et al. | 455/413 |
| 7,840,466 | B2* | 11/2010 | Frazier et al. | 705/35 |
| 2003/0014367 | A1* | 1/2003 | Tubinis | 705/64 |
| 2003/0119476 | A1 | 6/2003 | Asada et al. | |
| 2003/0157925 | A1* | 8/2003 | Sorber et al. | 455/406 |

(Continued)

FOREIGN PATENT DOCUMENTS

| | | |
|---|---|---|
| CN | 1856146 | 11/2006 |
| EP | 1718054 A1 | 11/2006 |

(Continued)

OTHER PUBLICATIONS

Japanese Patent Office, "Notice of Reasons for Rejection," issued in connection with application No. JP2008-298450, on Dec. 16, 2010 (10 pages).

(Continued)

*Primary Examiner* — Nimesh Patel
(74) *Attorney, Agent, or Firm* — Fish & Richardson P.C.

(57) ABSTRACT

The present disclosure described herein relates to a device and method for managing access to a service of an account associated with an electronic device is provided. The method monitors a status of the account. If the account is inactive, then a notification is provided on the device indicating same with an option to reactivate the account. Upon reactivation of the account, access to the service is provided. In the device five modules are provided to: evaluate a status flag associated with the account; generate a notification on a display when the account is inactive; control access to the service related to the account depending on the status flag; generate and send an outbound message from the device to request reactivation of the account when requested; and monitor for receipt of a signal indicating approval of reactivation of the account and to update the status flag.

28 Claims, 10 Drawing Sheets

(56) References Cited

U.S. PATENT DOCUMENTS

| | | | |
|---|---|---|---|
| 2003/0194070 A1 | 10/2003 | Shibasaki et al. | |
| 2004/0148237 A1* | 7/2004 | Bittmann et al. | 705/35 |
| 2004/0236834 A1* | 11/2004 | Kreitzer | 709/206 |
| 2005/0119016 A1* | 6/2005 | Neumann | 455/466 |
| 2005/0149436 A1* | 7/2005 | Elterich | 705/39 |
| 2006/0068797 A1 | 3/2006 | Iinuma et al. | |
| 2006/0246870 A1 | 11/2006 | Jeong | |
| 2007/0149252 A1* | 6/2007 | Jobs et al. | 455/566 |

FOREIGN PATENT DOCUMENTS

| | | |
|---|---|---|
| JP | 11331240 | 11/1999 |
| JP | 11341047 | 12/1999 |
| JP | 2002344666 | 11/2002 |
| JP | 2003125096 | 4/2003 |
| JP | 2003309671 | 10/2003 |
| JP | 2005236538 | 9/2005 |
| JP | 2006094371 | 4/2006 |
| JP | 2006311540 | 11/2006 |

OTHER PUBLICATIONS

Canadian Intellectual Property Office, "Office Action," issued in connection with application No. CA2,643,528, on Feb. 23, 2011 (3 pages).

Canadian Intellectual Property Office, "Office Action," issued in connection with application No. CA2,643,528, on Apr. 10, 2013 (3 pages).

Canadian Intellectual Property Office, "Office Action," issued in connection with application No. CA2,643,528, on Mar. 14, 2012 (3 pages).

State Intellectual Property Office of China, "First Office Action," issued in connection with application No. CN200810182168.3, on Nov. 12, 2010 (3 pages).

State Intellectual Property Office of China, "Rejection Decision" issued in connection with application No. CN200810182168.3, on Mar. 1, 2012 (2 pages).

State Intellectual Property Office of China, "Second Office Action," issued in connection with application No. CN200810182168.3, on Jul. 13, 2011 (3 pages).

State Intellectual Property Office of China, "Notification of Grant of Rights for Invention Patent" issued in connection with application No. CN200810182168.3, on Jun. 6, 2013 (4 pages).

European Patent Office, "Decision to Grant a European Patent Pursuant to Article 97(1) EPC," issued in connection with application No. EP07121368.0, on Oct. 20, 2011 (2 pages).

European Patent Office, "Communication Pursuant to Article 94(3) EPC," issued in connection with application No. EP07121368.0, on May 28, 2010 (7 pages).

Government of India Patent Office, "First Examination Report," issued in connection with application No. IN2777/CHE/2008, on May 13, 2013 (3 pages).

Japanese Patent Office, "Notice of Final Rejection," issued in connection with application No. JP2008-298450, on Jan. 31, 2012 (7 pages).

Korean Intellectual Property Office, "Notice of Decision for Patent," issued in connection with application No. 10-2008-0116137, on Dec. 23, 2010 (3 pages).

Korean Intellectual Property Office, "Notice Requesting Submission of Opinion," issued in connection with application No. 10-2008-0116137, on Jun. 24, 2010 (8 pages).

Intellectual Property Office of Singapore, "Notification of Grant," issued in connection with application No. 200808238-0, on Aug. 31, 2011 (2 pages).

Intellectual Property Office of Taiwan, "Notice of Allowance," issued in connection with application No. TW097144559, on Nov. 28, 2012 (3 pages).

Government of India Patent Office, "Second Examination Report," issued in connection with application No. IN 2777/CHE/2008, on Mar. 17, 2014, 2 pages.

Canadian Intellectual Property Office, "Office Action," issued in connection with application No. CA 2,643,528, on Jul. 30, 2014, 3 pages.

Wilson, Brian, "Free WiFi in Airports and Public Hotspots," The Ethical Hacker Network, Apr. 14, 2007, available at [https://www.ethicalhacker.net/columns/wilson/free-wifi-in-airports-and-public-hotspots], 6 pages.—cited in "Office Action," issued in connection with application No. CA 2,643,528 (NPL 1 cited herein).

\* cited by examiner

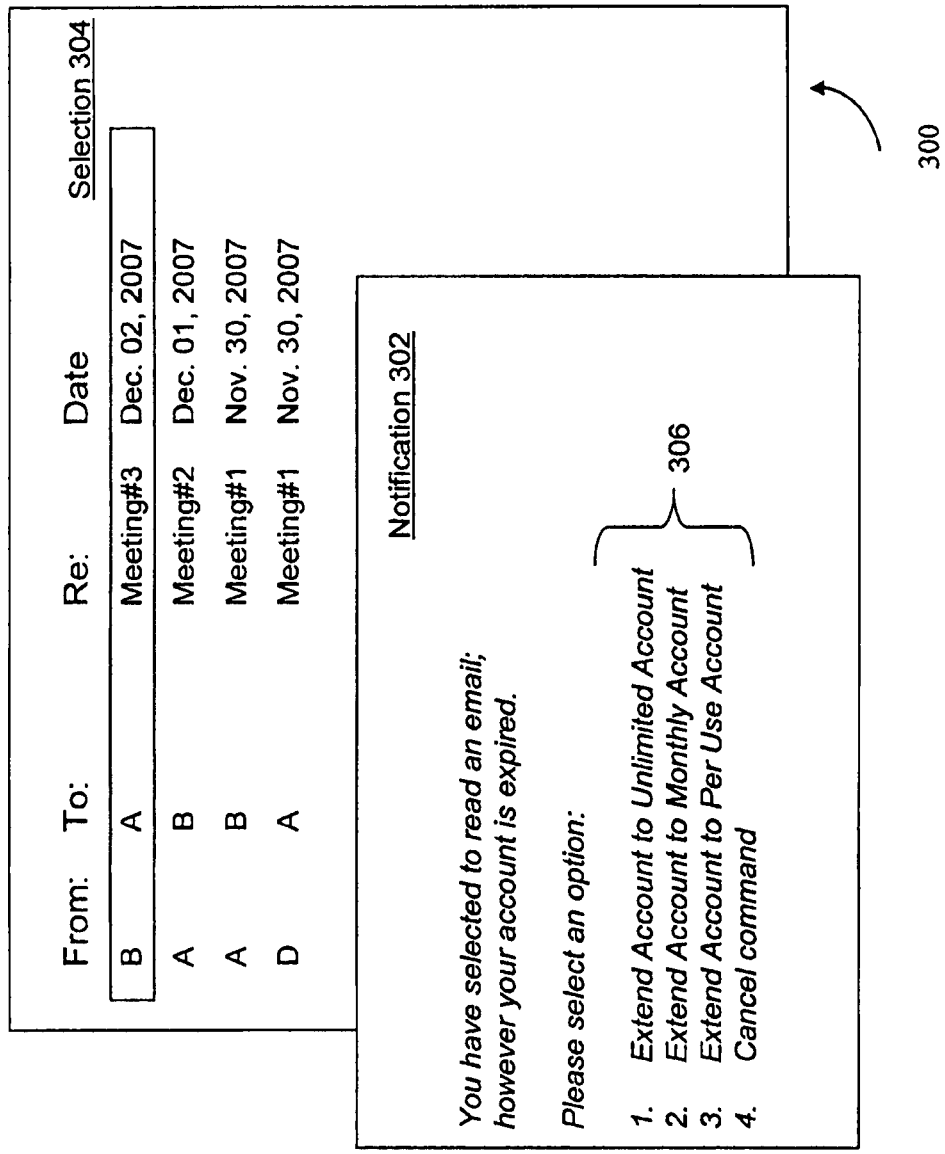

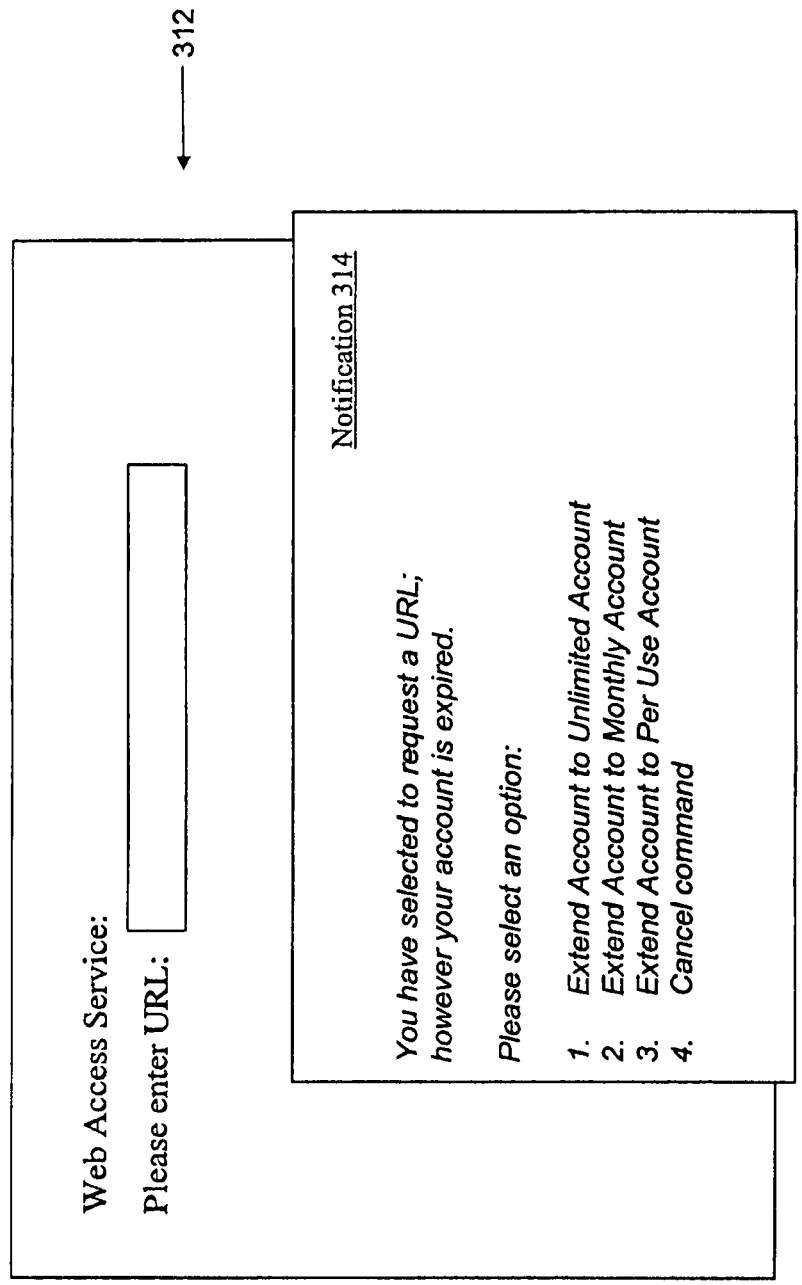

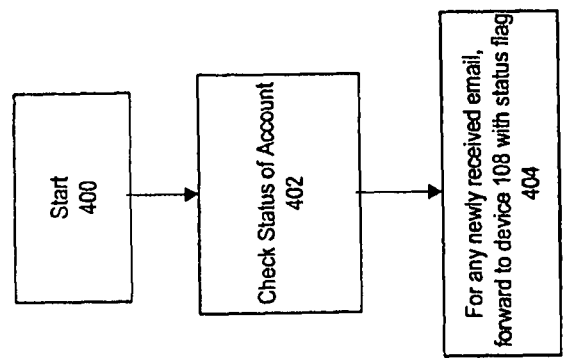

SYSTEM AND METHOD FOR MANAGING ACCESS TO SERVICES OF AN ACCOUNT FOR AN ELECTRONIC COMMUNICATION DEVICE

The present disclosure described herein relates to a system and method for managing access to a service relating to an account (such as a voice or data service) for an electronic communication device. In particular, the present disclosure described herein relates to monitoring access privileges for an account, determining when the privileges may be restricted and providing messages and options regarding the status of the account on the device.

BACKGROUND

A (wireless) handheld mobile communication device typically accesses a plurality of different networks, such as voice and data networks. As wireless communication devices are portable, they can connect and communicate with several different wireless communication networks as they roam. Data accounts can provide one or more services such as email, Internet access, Really Simple Syndication (RSS) feeds and other services to the device. One popular data service for a wireless device is email, which provides an ubiquitous means of electronic communications allowing a user to create and distribute an electronic message to others. Voice accounts can provide cellular telephone connectivity, text messaging, Short Message Service (SMS) and others.

Each service that the device subscribes to is typically associated with an account to track usage and billings for the device. Accounts may follow any accounting paradigms, for example: billing per time period, per use, flat fee, volume based (on either time or amount), etc. If an account expires for a service (for example upon exhaustion of a preset data amount), a service provider frequently sets a default "rollover" for the account, where the access is automatically extended, but the pricing and access features of the account are changed to a different class of account. Frequently, the new class has higher fees. As such, the user having a certain type of account may not be aware that his account has expired and automatically rolled over into a different account. As such, his usage charges would be higher and he may only discover this rollover upon receipt of his next statement for his account. For example, for a trial account, access is initially provided to the service for a limited time or data transfer amount. If the user exhausts his trial account associated with the device, he may not be provided with any indication that his account has expired and has "rolled over" into a different type of account.

There is a need for a system and method which addresses deficiencies managing access to such accounts as provided in the prior art.

BRIEF DESCRIPTION OF THE DRAWINGS

Embodiments of the present disclosure will now be described, by way of example only, with reference to the accompanying drawings, in which:

FIG. 3A is a schematic diagram of a graphical user interface (GUI) generated on a display of the device of FIG. 1 when an access request is made to review a received email related to an account that has expired, as generated by an embodiment associated with the device of FIG. 1;

FIG. 3C is a schematic diagram of another GUI generated on the display of the device of FIG. 1 when an access request is made to a web site for an account that is expired as generated by an embodiment associated with the device of FIG. 1;

FIG. 4A is a flowchart of exemplary steps executed by the email interface server of FIG. 1 when monitoring for emails that are to be forwarded to the device of FIG. 1, according to a first protocol;

DETAILED DESCRIPTION OF AN EMBODIMENT

Figure 1:
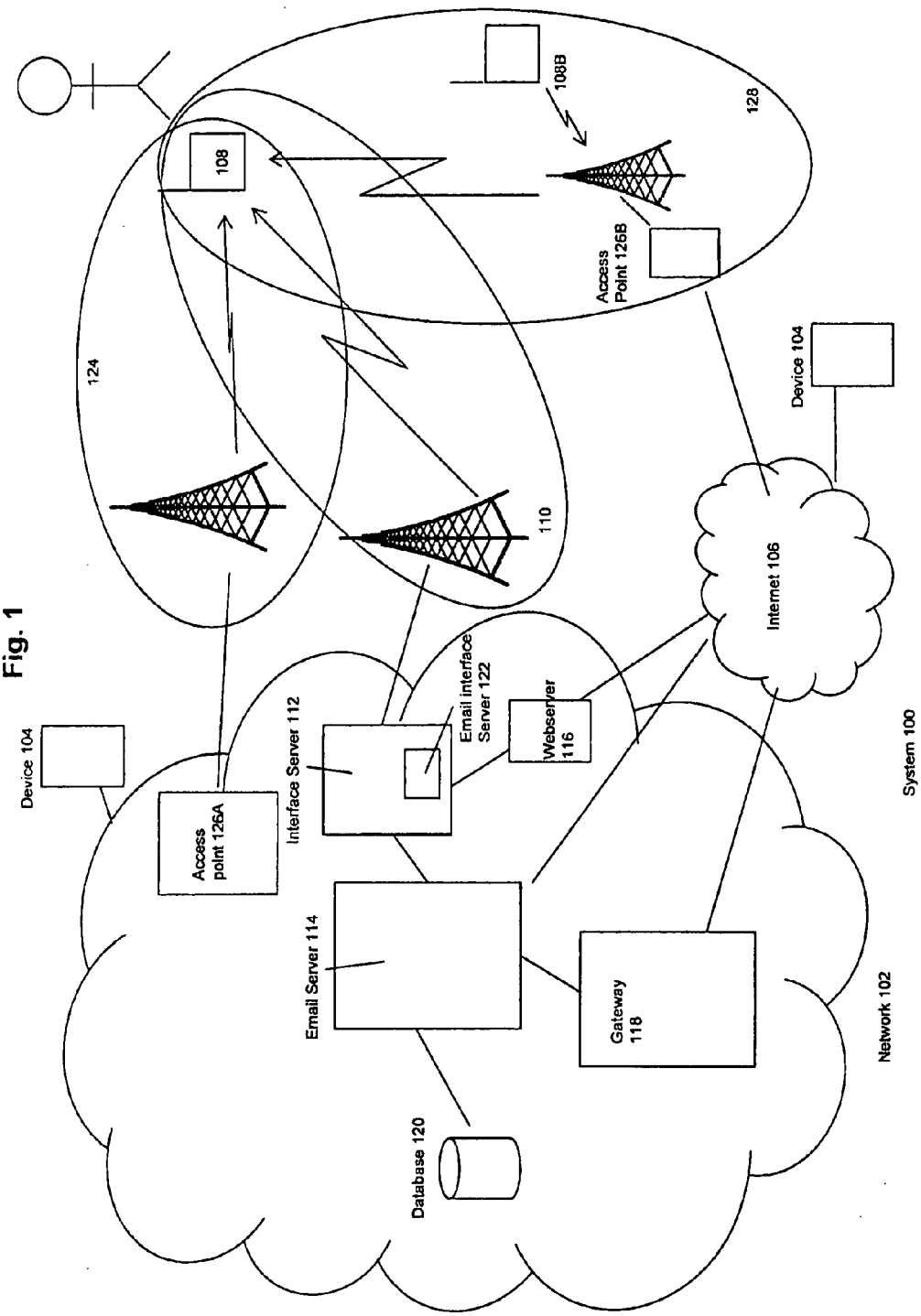
FIG. 1 is a schematic diagram of a device in communication with a communication network through an email interface server and in communication with other networks as provided in an embodiment.

The description which follows and the embodiments described therein are provided by way of illustration of an example or examples of particular embodiments of the principles of the present disclosure. These examples are provided for the purposes of explanation and not limitation of those principles and of the present disclosure. In the description which follows, like parts are marked throughout the specification and the drawings with the same respective reference numerals.

Generally, an embodiment provides a system and method managing access to a service (voice or data) for an account assigned to a communicator device. The embodiment may track the status of the account. When it is determined that the account has expired (either for time or data throughput limits), an embodiment may generate a notification on the device to let the user know that the account has expired when the device is initiating a request to a service relating to the account. The notification may be provided through one or more indicators, including: an icon, a "pop-up" message generated on the display of the device, activation of a special lamp on the device or additional notifications. The notification may provide an option to the user identifying options for continuing with the service, including options to extend or change the account limits or status. If an option is selected that relates to replenishing the account, the embodiment may then attempt to replenish the account as requested. If the account is reinstated, then the device may be provided with access to the initially requested service.

In a first aspect, a method for managing access to a service of an account associated with an electronic device is provided. The method monitors a status of the account. If the status of the account indicates that the account is inactive, then the method: provides a notification on the device that the account is inactive; and provides at least one option in the notification to reactivate the account.

The method may further comprise: upon selection of an option to reactivate the account, initiating a request to reactivate the account; and upon reactivation of the account, providing access to the service relating to the account.

In the method, the notification may be provided through a message provided in a graphical user interface (GUI) on a display on the device.

In the method, upon selection of the option to reactivate the account, a message may be sent from the device to a server in communication with the device that provides a request to reactivate the account.

In the method, while the account is inactive, another service associated with the account may be accessible by the device. For example, if an account manages emails and voice communications, if the account is inactive, the emails may be blocked, while the voice communications may still be allowed (or vice versa). Accesses for specific features in an account may be allowed or not allowed on a per feature basis. Different parameters may be used to determine whether a feature is allowed or not allowed access.

In the method, the service may be to provide access to received emails addressed to the device.

In the method, the service may be to provide access to an Internet web site.

The method may further comprise providing a part of the service to the device when the account is inactive. Part of the service may be to provide an indication of a received email by the device.

In the method, the account may relate to emails for the device. Further, while the account is inactive: emails relating to the account may be continued to be received by the device; and the emails that are received while the account is inactive may have limited access privileges when accessed through the device.

In the method, the status of the account may be provided in a flag associated with the received email; the device may evaluate the flag to determine a level of access to the received email by the device.

In the method, the status of the account may be provided in a global flag that is provided to the device; and the device may evaluate the flag to determine a level of access to the received email by the device.

In the method, emails relating to the account may be provided to the device on a push basis from an email interface server. Alternatively or additionally, emails relating to the account may be provided to the device on a pull basis from an email interface server after a request is initiated from the device.

In a second aspect, an electronic device providing a communication service relating to an account is provided. The device comprises five modules. The first module evaluates a status flag associated with the account. The second module generates a notification on a display of the device when the status flag indicates that the account is inactive, where the notification provides an option to reactivate the account. The third module controls access to the service related to the account depending on the status flag. The fourth module generates and sends an outbound message from the device to request reactivation of the account upon activation of the option to reactivate the account. The fifth module monitors for receipt of a signal indicating approval of reactivation of the account and to update the status flag reflecting the approval.

In the device, the service may relate to receiving inbound electronic communications from a remote server. The remote server may be any one or part of an email interface server, an email server or an interface server.

The device may store received electronic communications from the remote server and may selectively provide access to one or more of the received electronic communications based on the status flag.

In the device, while the account is inactive, another service associated with the account may be accessible by the device.

The device may: continue to receive the inbound communications relating to the account from the remote server while the status flag indicates the account is inactive; provide a list including the inbound electronic communications while the status flag indicates the account is inactive; and provide limited access rights to at least one of the inbound communications while the status flag indicates the account is inactive.

The device may adjust the limited access rights after the status flag indicates the account has been reactivated.

In other aspects, various combinations of sets and subsets of the above aspects are provided.

Exemplary details of embodiments are provided herein.

First, a description is provided on an exemplary communication device according to an embodiment that has access to networked voice and data communication services. Referring to FIG. 1, in system 100 device 108 can communicate with one or more networks, including network 102 and networks 110, 124 and 128. Device 108 may be a data communication device, a voice communication device, or a multiple-mode device capable of voice, data and other types of communications. Device 108 may be a wireless handheld device, cell phone, smart phone, personal digital assistant (PDA), and/or computer (either desktop or portable) having a (wireless) network card, network adapter and/or network interface controller (NIC) installed therein.

Device 108 may subscribe to one or more voice or data services that are provided through one or more of networks 102, 110 and 124. The services may be associated with account that may need to be activated in order to allow such services to be provided. One feature of an embodiment is to track access privileges for one or more of the accounts for the services provided to device 108 and to provide a notification on device 108 when the privileges are about to change (or have changed). The notification may be generated when a request for a service for an expired or exhausted account is initiated. Options for (re)activating the account may be provided in the notification. Once an option is provided, an account may be re-activated or replenished and then access may be provided to the initially requested data or service.

Before specific details are provided on features of an embodiment, a description is provided on the networks that communicate with device 108. Network 102 provides a suite of applications, services and data to its connected devices 104 through its associated servers. Devices 104 connect to network 102 through wired connections or through an external connection through Internet 106. Device 108 may connect to network 102 as per device 104, although this connection is not shown in FIG. 1. Network 102 can be implemented in any known network architecture topology.

As part of network 102, email server 114 provides a messaging client allowing devices 104 (and device 108) to exchange electronic messages and attachments within network 102 and with exterior devices and networks. For an IP-based network, email server 114 has software configured to monitor specific ports on which emails to and from its associated devices 104 are sent and received. Two commonly used message servers for email server 114 are Microsoft Exchange (trademark) and Lotus Domino (trademark). In either server, messages are received by email server 114 from various devices. These messages are then distributed to the appropriate mailboxes for user accounts addressed in the received message, and then accessed by a user through a computer system operating as a messaging client. A Wireless Application Protocol (WAP) gateway provides an alternate interface to a user's mailbox on email server 114, through which a list of messages in a user's mailbox on the email server, and possibly each message or a portion of each message, could be sent to device 108. Database 120 provides a data storage system for one or more elements in network 102, including email server 114.

Gateway 118 provides and monitors selected communications between elements in network 102 and external devices connected through Internet 106. Email server 114 is shown as passing its external (non-wired) emails through gateway 118. In other network configurations, email server 114 may bypass gateway 118 to access Internet 106.

In network 102, a series of linking modules and servers are provided to connect network 102 to other networks. A Wide Access Network (WAN—not shown) may also be connected to network 102 to allow a remote device 104 to connect to network 102. Alternatively, private wireless network gateways, such as wireless Virtual Private Network (VPN) routers, could be implemented to provide a private interface to a wireless network.

Further detail is now provided on other networks that communicate with device 108. First, network 110 is an exemplary external network that is connected to network 102. Interface server 112 provides an interface between network 102 and wireless network 110. As such, selected services provided by network 102 may be accessible by device 108 through network 110, such as email services and Internet services. To that end, interface server tracks connections addresses for device 108, and encodes and transforms messages for wireless transmission from network 102 to network 110. Web server 116 is connected to interface server 112 and provides an interface for web page requests received from device 108 through network 110. The web pages may be stored locally within network 102 or may be located elsewhere in Internet 106.

Email interface server 122 tracks and forwards emails between network 102 and 110 for server 112. Email interface server 122 may be configured to receive all or a selection of emails from email server 114 and repackage and forward the emails to network 110 for distribution to device 108. As such when emails are provided from email server 114 to interface server 112, another local copy of the email may be stored in email interface server 122.

Wireless network 124 provides another communication link for device 108 to network 102. Wireless network 124 may be a data-centric network, a voice-centric network, or a dual-mode network. In one embodiment, wireless network 124 is implemented as a Wi-Fi network generally following standards set by the IEEE LAN/MAN Standards Committee, known as IEEE 802, through its working group "11". The 802.11 standard defines media access control (MAC) and physical (PHY) layers in the Open Systems Interconnection (OSI) protocol model for WLAN. Such standards are known to those of skill in the art. Administrative functions for wireless network 124 may be provided by software controlling it. The software may administer functions such as network identification and network access parameters. The initial 802.11 standard was followed with a series of amendments, where each amendment was identified by an alphabetic suffix following in the standard's numeric identifier "802.11". The family of 802.11 amendments is sometimes referred to as the 802.11x family. Currently, the 802.11 amendments encompass six wireless modulation techniques that all use the same communication protocol among their communicating elements. Such networks are deployed in one or more of the five current versions of 802.11: 802.11a, b, g and n. Specific transmission details and parameters of these networks are known to those of skill in the art.

Wireless network 124 includes an antenna and supporting radio transmission equipment known to those skilled in the art. Access point (AP) 126A is shown in network 102 and in an embodiment AP 126A is an IEEE 802.11 radio receiver/transmitter (or transceiver) and functions as a bridge between network 124 and network 102. For security, AP 126A may be communicatively coupled to network 102 through a respective firewall and/or VPN (not shown). The AP provides data distribution services among devices 108 within wireless network 124 and between devices 108 in wireless network 124 and other devices in other connected networks. One distribution service provided by AP 126A for its related stations is to establish a logical connection to its communicating devices 108. As with network 110, an administrative server (not shown) may be provided for account(s) associated with device 108 for network 124.

Further, device 108 may communicate with device 108B through cellular network 128. The coverage area of network 128 may overlap with the coverage areas of networks 124 and 110. Cellular network 128 provides voice and data services to devices 108 and 108B. Data-centric technologies for cellular network 128 include the Mobitex (trademark) Radio Network ("Mobitex") and the DataTAC (trademark) Radio Network ("DataTAC"). Voice-centric technologies for cellular network 128 include Personal Communication Systems (PCS) networks like Global System for Mobile Communications (GSM) and Time Division Multiple Access (TDMA) systems. Certain networks provide multiple systems. For example, dual-mode wireless networks include Code Division Multiple Access (CDMA) networks, General Packet Radio Service (GPRS) networks, and so-called third-generation (3G) networks, such as Enhanced Data rates for Global Evolution (EDGE) and Universal Mobile Telecommunications Systems (UMTS). Other network communication technologies that may be employed include, for example, Ultra Mobile Broadband (UMB), Evolution-Data Optimized (EV-DO), and High Speed Packet Access (HSPA), etc. Again administrative server (not shown) may be provided for account(s) associated with device 108 for network 128.

Network 128 may also have an access point to connect its devices to other networks. For example, network 128 may be implemented to support General Packet Radio Service (GPRS) for a Global System for Mobile Communications (GSM) and IS-136 mobile phones. Access point 126B may provide an interface for remote data and services for devices in network 128, including device 108.

An Access Point Name (APN) associated with AP 126B identifies what external network(s) are accessible by device 108 from network 128. In managing and processing requests for data or access to an external service, such as IP access, an embodiment may send SIM and provisioning information and other data, such as username/password, from device 108 to network 128, so that network 128 can determine which APN to use for device 108. At this point, an assessment may be made regarding the status of the related account for device 108. If the account is validated, then a link to the external network (such as a PPP link) may be allowed to be established for device 108 and the service request is completed.

Turning back to features relating to managing an account accessed by device 108 per an embodiment, each of network 102, 110, 124 and 128 can provide a combination of voice and data services that can be accessed by device 108 (and device 104). Data accounts can provide one or more services such as email, Internet access and others. An email account is one popular data service. Voice accounts can provide cellular telephone connectivity, text messaging, SMS, multimedia messaging services (MMS) and others.

One feature of an embodiment monitors voice and data accounts related to a network, such as network 124 or 128, for device 108. The embodiment may initiate generation of specific messages and/or notifications when certain services of the account are accessed (or attempted to be accessed) by device 108. The contents or issuance of a notification may depend on the status of an account. When a notification is generated for one account (or one part of one account), the device may or may not have similar messages generated when other services are accessed.

In order to provide the above noted feature, a current status of one or more account(s) associated with device 108 need to be accessed and tracked. For network 110 this is provided through an administrative server (not shown) and may be implemented as part of interface server 112. Alternatively part of the administrative server may be implemented in a remote server (not shown) that is accessible by interface server 112. The administrative server may monitor the usage, time access, payment information and other administrative data for the account(s) associated with device 108 for network 110. Similar administrative servers may be provided for networks 102 and 128. Email interface server 122 may also access account data from the administrative server.

Figure 2:
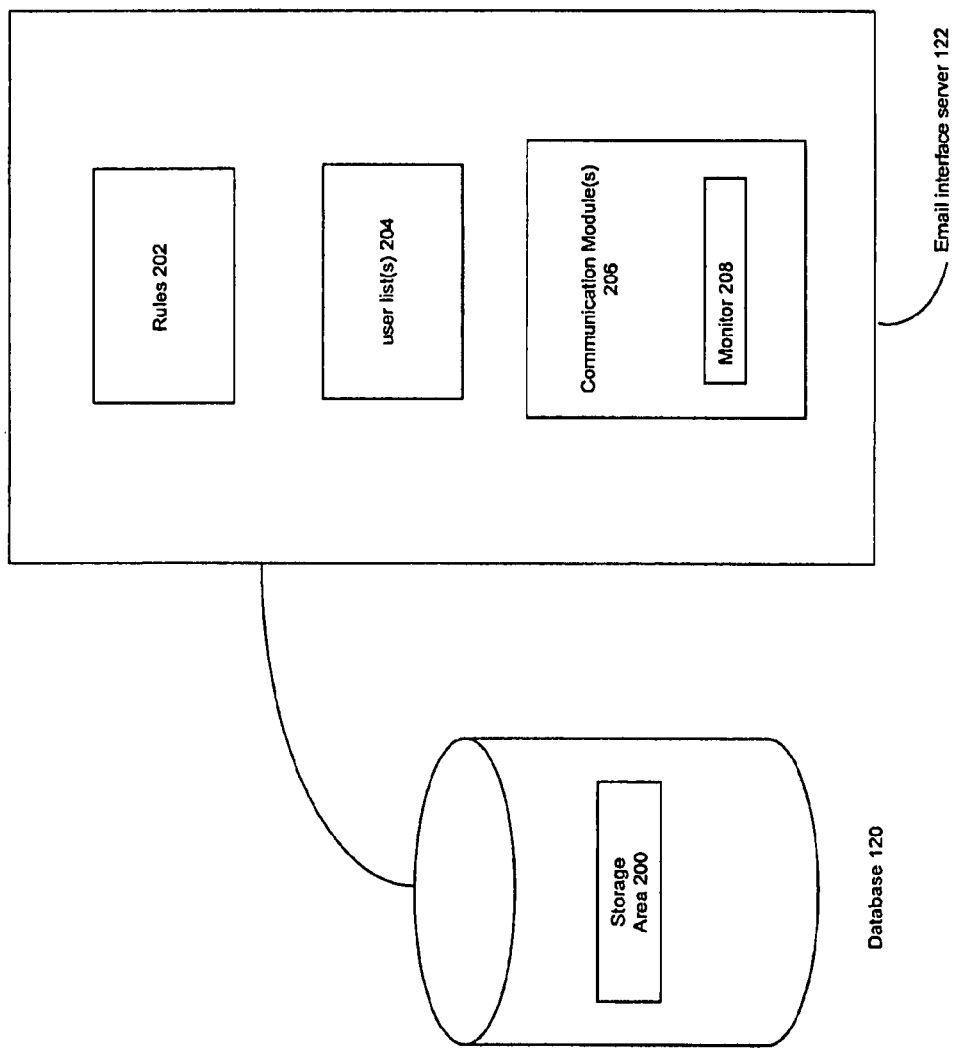
FIG. 2 is a block diagram of the email interface server of FIG. 1.

Now, further detail is provided on operational elements relating to email interface server 122, in regards to its components and features that provide an email transmission service for device 108 to communicate emails for device 108 between network 110 and network 102. Referring to FIG. 2, email interface server 122 provides a mail transfer agent (MTA) that routes emails and provides a mail server for messages destined for device 108 in network 110. Typically, email interface server 122 is provided with a copy of each email and calendar message processed by email server 114. One exemplary implementation of email interface server 122 provides BlackBerry Internet Service (BIS) (trade-mark) that forwards emails from network 102 to device 108 through network 110. Another exemplary implementation of email interface server 122 is a BlackBerry Enterprise Server (BES) (trade-mark). An embodiment may be implemented as part of either a BIS, BES or other server, such as a Microsoft Exchange (trade mark) server.

Email interface server 122 is a computer-based system having communication connections software and data storage. Email interface server 122 may provide emails to device 108 in a "push" protocol where emails are automatically (periodically) encoded and forwarded to device 108. Such is the operation of the BIS. Alternatively, email interface server 122 may provide emails to device 108 in a "pull" protocol, where such messages are forwarded only upon receipt of a "request to send" message from device 108. Email interface server 122 has the following components related to processing emails: storage area 200, rules 202, user list 204 relating to devices tracked for network 110 and communication modules 206. The storage area 200 and user list(s) 204 may be supported in database 120. Rules 202 may be embodied in software or firmware operating on server 122. Communications modules may be embodied in a set of firmware, hardware and software modules.

Storage area 200 is used to store local mail for local users and provides a temporary site for storage of messages as they are put in the process of being transmitted. Rules 202 provide a set of predetermined actions for email interface server 122 when certain conditions are detected for messages or accounts processed by email interface server 122. Exemplary rules may initiate request for account information from the administrative server, evaluate the response and provide certain actions for emails depending on the results. The rules may be implemented in software and storage area 200 may allow changes to the rules. Further details on rules relating to an embodiment are provided later. Storage area 200 may also store data relating to status flags for accounts. The list of users 204 provides a database of local email accounts managed by email interface server 122.

The communication modules 206 provide lower level operations that allow for monitoring, processing and transferring of messages, signals and emails among email interface server 112, its clients (e.g., devices 104) communications with email server 114.

Monitor module 208 is provided within or is associated with communication modules 206 to provide specific monitoring of new messages as they are being generated by devices communicating with email interface server 122.

Communications between device 108 and email interface server 122 and between email interface server 122 and email server 114 may be conducted through generation, transmission, receiving and processing of predetermined messages by each of device 108 and email interface server 122 and email server 114. The messages may have a set data field(s) that is populated when the message is generated. A message may include the email message as an attachment. Messages may follow or be based on messaging protocols known to those of skill in the art.

Turning now to device 108, in conjunction with email interface server 122, in order to review emails received from email interface server 122, device 108 has a local client (software/firmware) application which processes emails received from, and sent to, email interface server 122. Depending on whether email interface server 122 operates in a "push" or "pull" mode affects how the client application receives, retrieves and processes emails.

When email interface server 122 operates in a "push" mode, emails are automatically received by device 108. As such, client application can selectively view recent emails without further interaction between device 108 and email interface server 122. Emails may be pushed to device 108 continually and a level of access to them in device 108 may subsequently be limited and controlled by evaluating the status of an underlying account for the email service. A level of access to a received email may define access properties for an email by device 108, including for example whether an email can be read (or not), replied to (or not), forwarded (or not), viewed only, viewed only in a summary list, etc., or any combination of such access properties. Access limits may include any one or combination of the access properties. If the account is inactive, then the locally stored email on device 108 may not, in certain configurations, be viewed and only limited details about the email may be made accessible by device 108. For example, only a summary of the email (sender, title, time, attachments, etc.) may be provided in an email summary list in a GUI on device 108.

If email interface server 122 is operating in a "pull" mode, email interface server 122 receives external messages destined for device 108 and stores them without automatically forwarding them to device 108. In order for device 108 to retrieve such queued messages from email interface server 122, device 108 must request such messages to be provided to it. As such, when device 108 wishes to retrieve such emails, the client application operating on device 108 initiates a request to email interface server 122 to send a copy of the queued emails to device 108. Email interface server 122 would respond by sending the queued emails to the device 108 for its review and processing. Once queued emails are downloaded to device 108, one embodiment allows device 108 to access the downloaded emails, regardless of the status of the underlying account. Another embodiment may dynamically control access to locally stored data for an account in device 108 if the account is not active. It will be appreciated that embodiments can use either "push" or "pull" protocols to provide data and services to device 108 according to an embodiment. There may also be hybrid protocols.

An access to data or service for an account for device 108 may be implemented as one of various levels of access, per an embodiment.

In one embodiment, once the data is pushed to the device, the device may be allowed to view and use the data without restrictions (or with minor restrictions). However, if the status of the account indicates that the access to the related service by device 108 is restricted, then a notification may be generated and additional commands or access relating to the data provided by the service may be restricted. For example, for a dormant email account, a previously received email may be viewed. However, further actions related to it (e.g. sending a reply) may be prohibited while the account remains dormant. In another embodiment, if an email account of a device becomes dormant, then a previously downloaded message may be restricted. When the account is reactivated, then the access may be reactivated.

In another embodiment, data is continually pushed to the device regardless of the status of the underlying account. However, when device 108 attempts to view a an email, at that point the status of the account is checked. (Alternatively, a message may be automatically sent from the network to device 108 upon a change in status of the account.) When device 108 attempts to access its locally stored email(s), if the account is active, then access is provided to the stored email(s). If the account is dormant, restricted or prohibited, then a notification may be provided and additional commands or access relating to the emails may be restricted. One account may be used to manage several features and/or services. For example, an account may manage emails and voice communications. Different levels of access can be provided to each feature, if the account is inactive. For example, the emails may be blocked, while the voice communications may still be allowed (or vice versa). Accesses for specific features in an account may be allowed or not allowed on a per feature basis. Different parameters may be used to determine whether a feature is allowed or not allowed access. When the account is reactivated, then the access may be reactivated fully or partially. Other variations on determining when access is provided to an email or service may be provided.

Coordination of recognition of the status of an account and a level of access to a related service or data for the account for a device may be achieved through generation and exchange of messages or status flags between the server controlling access to the service and the device.

Further details are now provided for an embodiment illustrating methods for evaluating, transmitting and using the status of the underlying account for an email service for device 108 when processing, forwarding and for accessing emails by device 108. It will be appreciated that access to other services, such as Internet access, SMS messaging remote data accesses, etc. may also be controlled in a comparable manner as described herein per another embodiment.

Broadly, an embodiment tracks the status of an account for device 108, such as an email account. This tracking may be implemented by using and accessing one or more processes and status flags in device 108 and email interface server 122. If the status of the account indicates that it is active (i.e. in good standing), then when device 108 activates a request for an email or initiates a send command for an outbound email, the command or request is allowed to continue. However, if the status indicates that the account is expired or is otherwise in arrears, then the command or request is preferably not automatically initiated. In that situation, a notification may be generated on the display of device 108 indicating that the account is expired or in arrears. The notification may be provided as a window with a message in a GUI generated on the display. The notification may provide options to the user to allow device 108 to subsequently execute the command if the account is authorized to be reactivated or extended in some fashion. A similar monitoring process can be provided for other data services, such as web accesses, Really Simple Syndication (RSS) feed formats, etc.

It will be appreciated that it is useful to communicate and coordinate status information about an account among the administrative server, email interface server 122 and device 108. Two exemplary mechanisms for communicating this status is through status flags or semaphores. One or more status flags (such as an "account active" flag) can be embedded or attached to data communications sent between email interface server 122 and device 108. As such, when an email message is being sent from email interface server 122 to device 108, an additional status flag may be attached to the message. Additionally, email interface server 122 may periodically send an account status message (e.g. active/not active) to device 108. Any (account) status flag or message received by device 108 would likely need to be extracted, perhaps stored, and interpreted by device 108 through its local email (or data access) application.

It will be appreciated that a status flag may be set by protocol to have a global effect or a local effect. If the flag is defined to have a global effect, then the protocol may dictate that the flag's value supersedes any other status indicators. As such, if device 108 receives a status flag that is global, that value may govern processing of all services. Alternatively, if a status flag is set to have a local effect, the protocol may dictate that the flag's value is to be associated with only a certain set of services (or messages), such as emails, SMS messaging or Internet accesses. This may be implemented for example, when a status flag is provided in an email message forwarded to device 108. In such an instance, the protocol may dictate that the value of the flag is used to govern processing of that message, even perhaps regardless of a global flag. When evaluating a status flag, additional data, such as timestamp data, location data or other information, may be used to make a final determination on whether to allow access to the service.

In one instance for an embodiment, device 108 may use the status information in the status flag or message as follows. If a command on device 108 is initiated to receive or send an email message (or activate other data services), then prior to initiating the command, the local application operating on device 108 may either request or review the account status information for the account related to the email service. Depending on the indication of the account status, device 108 may or may not allow the command to be initiated.

Figure 3B:
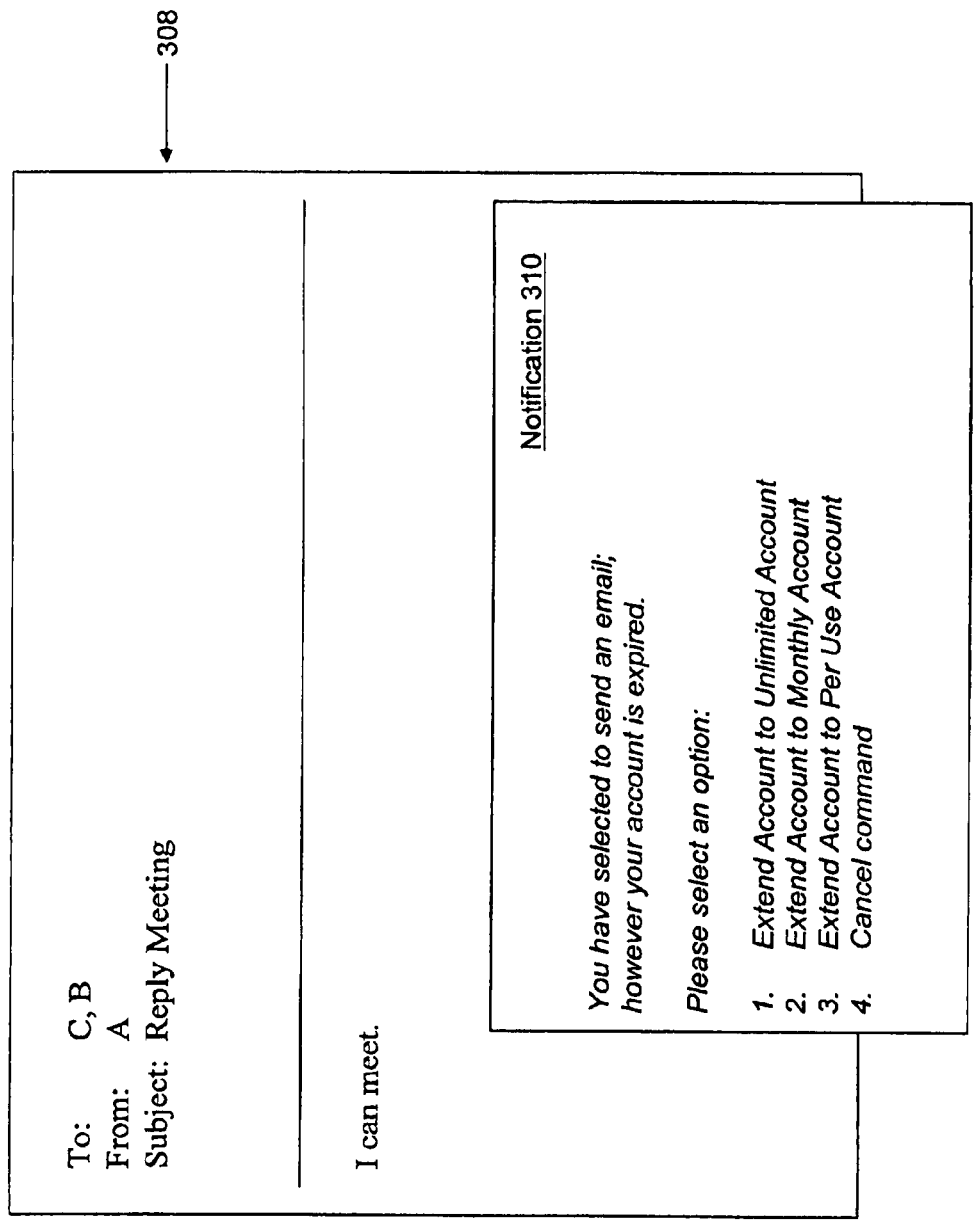
FIG. 3B is a schematic diagram of another GUI generated on the display of the device of FIG. 1 when a request is made to send/generate an email relating to an email account that has expired, as generated by an embodiment associated with the device of FIG. 1.

When the status indicates that the account is expired or inactive, notification may be provided on device 108. Exemplary notifications generated by an embodiment on device 108 are shown in FIGS. 3A-3C. First, in FIG. 3A, email list 300 is shown in a GUI on display of device 108. The account is expired for the present example and that user "A" is the holder of the account associated with device 108. Notification screen 302 is generated when user attempts to activate email 304 (shown as boxed selection 304), as its associated status flag indicates that it was sent to device 108 when the account was expired (for this example). Screen 302 provides options 306 commands, including: Extend Account to Unlimited Account; Extend Account to Monthly Account; Extend Account to Per Use Account; and Cancel command. Other options for the account may be provided. If any of reactivation option 306 is selected through a GUI selection interface, then device 108 recognizes the option and sends a message to email interface server 122 to reactivate the account per the level requested. The status flag for the emails may be updated by a process operating on email interface server 122 or on device 108. Once the status is reset, further or full access to the selected email may be provided. In FIG. 3B, the user of device 108 has initiated a process on device 108 to create a new outbound email message as per GUI window 308. As the account is expired, notification 310 is generated having a similar option list to notification 302. In FIG. 3C, the use of device 108 has initiated a request for a URL to access the Internet as a data service per window 312. The notification may be generated when specific URLs or categories of URLs are entered (including any URL). Similarly, a notification may be generated for a request for any predetermined remote data. Again, the account is expired, notification 314 is generated having a similar option list to notification 302.

Further to FIGS. 3A-3C, Table A provides a non-exhaustive list of exemplary notifications that may be generated when a command for an external data service is being requested when that account for the service is expired:

If a selection from the notification is to extend the related account for the service, then device 108 may send a message to email interface server 122 providing details on the type of extension selected for the account. When email interface server 122 receives the message, it may send a further message to the administrative server to update its records. The administrative server may then update its records and send a confirmation message to email interface server 122. The confirmation message may include any amendments made by the administrative server to the type of extension/change actually implemented. Then, email interface server 122 may review its records and status flags and send updated status flags and/or replacement messages containing previously sent emails with updated status flags to device 108. When device 108 receives the updated status flags, it may selectively allow access to the services (emails) depending on the parameters of the account extension provided from email interface server 122. If email interface server 122 is operating on a "push" protocol, then previously pushed services and data (emails) may or may not have their accesses updated according to the current status of the account. If email interface server 122 is operating on a "pull" protocol, then device 108 may be provided with services and data (emails) only when the account is active.

Figure 4B:
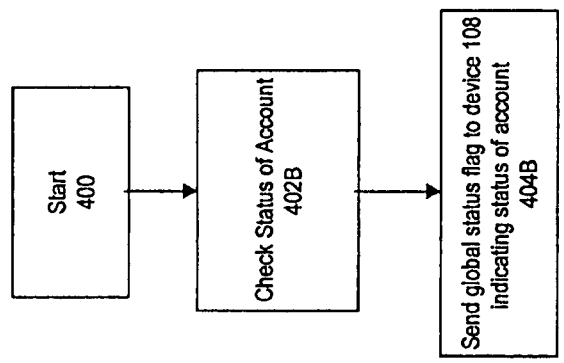
FIG. 4B is an alternative flowchart of exemplary steps executed by the email interface server of FIG. 1 when monitoring for emails that are to be forwarded to the device of FIG. 1, according to a second protocol.

Further detail is now shown in FIGS. 4A and 4B relating to two exemplary processes that may be executed on email interface server 122 during monitoring of incoming emails, representing instances of local and global status flags (as described earlier).

TABLE A

| Event | Notification |
|---|---|
| Accessing of an email history list generated on the display | Warning window is generated on the GUI of the display, providing options for extending account. Window may be generated only when a particular email is selected for viewing |
| Accessing a "new mail" command (or activating a "send" command) | Warning window is generated on the GUI of the display, providing options for extending account and for cancelling the command. |
| Receipt of an RSS stream | Warning window is generated on the GUI of the display, providing options for extending account and for stopping receipt of the stream. |
| Entry of a URL to access a Web page | Warning window is generated on the GUI of the display, providing options for extending account and for cancelling the command. The warning window may be generated when specific URLs or categories of URLs are entered (including any URL). |
| Activation of a "new call" command to initiate a voice call | Warning window is generated on the GUI of the display, providing options for extending account and for cancelling the command |
| Receipt of incoming call | Warning window is generated on the GUI of the display, providing options for extending account and to decline the call |

When a selection is made from a notification generated on device 108, a message may be provided from device 108 to email interface server 122, indicating the selection. Additional messages may be generated and sent to email interface server 122 on other events, such as generation of a new email or requesting a (data or voice) service on device 108. The notification may include the type of service being requested, the time and the current account status tracked by device 108. Email interface server 122 may analyze this data and take further actions, as deemed appropriate.

If a selection from the notification is made to extend or change the account for the service, then messages may be generated, sent, received and acted upon among device 108, email interface server 122 and the administrative server to update the status of the account and allow access to the requested service.

In FIG. 4A, a "local" status flag for the account status is associated with each email. After start 400, email interface server 122 checks for the status of the account at step 402. This may involve sending an account status request command to the administrative server. Presuming that the account status information is returned to email interface server 122, when an email is received that is destined for device 108, at step 404, the received email is bundled into a transmission package per the protocol of network 110 and the value of the account status flag is incorporated into the package. The process may be in an endless loop or may be implemented as an interrupt routine or other programming techniques.

In FIG. 4B, a "global" status flag for the account status is provided. After start 400, email interface server 122 checks for the status of the account at step 402B. This may involve sending an account status request command to the administrative server. Presuming that the account status information is returned to email interface server 122, at step 404B, a message is generated and sent to device 108 in a transmission package per the protocol of network 110. The process may be in an endless loop or may be implemented as an interrupt routine.

Figure 5:
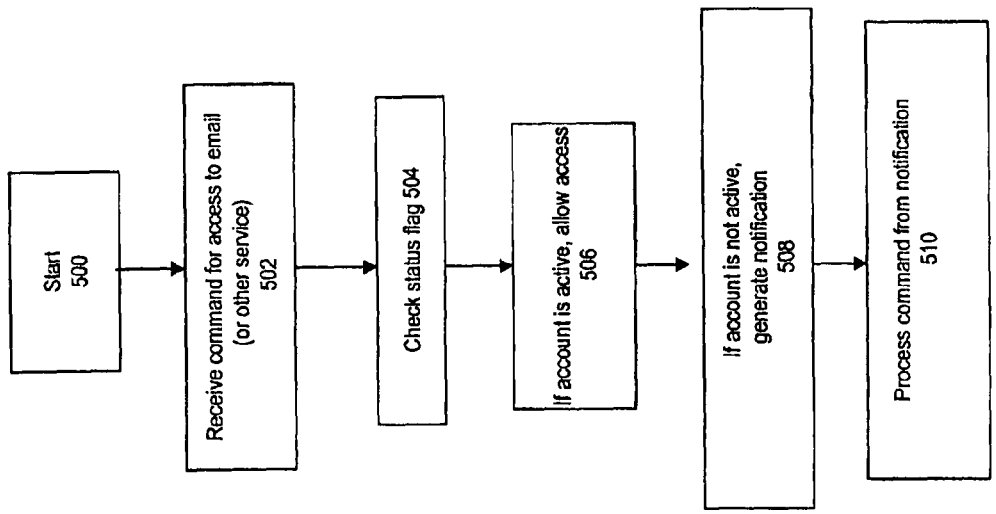
FIG. 5 is a flowchart of exemplary steps executed by a device of FIG. 1, communicating with the email server of FIG. 1 when attempting to access a received email in accordance with an embodiment.

FIG. 5 provides a description of a process operating on device 108 that determines actions when a request for a service is initiated on device 108 per the protocols as shown in either FIG. 4A or 4B. As noted earlier, the status of the account associated with the service is preferably determined as part of a request for a service or data. As per the processes in FIGS. 4A and 4B, email interface server 122 has been providing status information to device 108 through messages to device 108. In device 108, after start step 500, device 108 waits for activation of a command requesting access to a (data) service in step 502. After the command is initiated, at step 504, the status of the account flag is checked. This may involve evaluating a global account status flag or a local account status flag (per FIGS. 4A and 4B), depending on status flag protocol (as described earlier) provided by network 110. If the account is determined to be active, then at step 506, the service is provided to device 108. If the account is not active, then at step 508, a notification is generated on device 108. The notification may take the form of any of the notifications provided in FIGS. 3A-3C, depending on the service being initiated. If any option is selected from the notification, then it is implemented at step 510. As noted earlier, if the option includes a request to extend the account, then once the account is extended, access to the service may be provided. The process may be implemented in software or firmware as a repeating loop or as an interrupt routine. It will be appreciated that in an embodiment, the notification is provided upon determination that the account is expired or inactive. The notification may also be provided as the account is about to become expired or become inactive. Inactivity may be a condition of the location, age or other conditions or states of device, relating to the network providing the service. For example, in a roaming environment, an account may be set to be inactive as the communication signal with device 108 for network 110 drops below a predetermined threshold.

Upon reactivation of an account, a consistency check may be performed to determine whether any previously received emails at device 108 need to have their account status flags updated or whether additional emails should be retrieved from email interface server 122 depending in part on whether email interface server 122 is operating as a "push" or "pull" protocol and whether the status flags are "global" and/or "local" in effect.

It will be appreciated that the processes shown in FIGS. 4A, 4B and 5 illustrates exemplary methods for processing requests for services between device 108 and email interface server 122. Some of the steps may be conducted in different orders in other embodiments and additional steps may be provided or some of the steps may be removed. Similar or equivalent processes may be expressed in state diagrams. Further still, in another embodiment, processes as described above in for the email interface server 122 and device 108 in receiving, tracking and processing of emails and any notifications related thereto may be implemented in on a single system or device, such as solely on as a client system communicating with a server, on a stand alone computer or on device 108.

Features of an embodiment may be implemented for other types of networks. For example, when device 108 is implemented as a cellular phone and network 128 is implemented as a GSM network, an embodiment may initiate generation of specific messages and/or notifications when certain GSM services of the account are accessed (or attempted to be accessed) by device 108. Again, the contents or issuance of a notification may depend on the status of an account. When a notification is generated for one account (or one part of one account), the device may or may not have a restriction imposed on other services or messages for that account or other accounts.

Continuing with the example of a GSM network for an embodiment, AP 126B may act as a gateway to services connected "downstream" to network 128 (here, shown as Internet 106). As is known in the art for a GSM network, AP 126B may communicate via messages with device 108 to determine the contents of the SIM card connected to device 108. AP 126B may have components and modules similar to email server 122 as shown in FIG. 2.

In an exemplary GSM configuration, external services provided to network 128 through AP 126B are provided to device 108 therein only after AP 126B contacts device 108 and evaluates the account associated with device 108 per data stored in the SIM card associated with device 108. As such, when device 108 is initiated to request recently received emails processed through network 128, in an embodiment the client application on device 108 generates a message to request AP 126B to sends a copy of queued emails to the device 108. AP 126B would check the status of the account stored in the SIM card of device 108. If the account is valid and active, AP 126B may send the queued emails to device 108. A status message relating to the account may also be sent. As noted before, once downloaded, the queued emails may be viewed regardless of a subsequent deactivation of the related account. However, if the account is either not valid or not active, AP 126B may respond by not sending the queued emails to device 108 and may send a status flag or message that the account is inactive. Additionally or alternatively, a summary list of the queued emails may be sent or the queued emails may be sent with a status flag marking the account as being "inactive" (or the like) for each email. Upon a review of the global status flag or the status flags of the received emails, if the account is noted as being "inactive", then device 108 may generate a notification as provided in FIG. 3B or 3C and may provided limited access to the emails. Thereafter any response provided by device 108 may be further processed by AP 126, including requests to reactive the account. Depending on the nature of the response, the account may be reinstated and the queued emails may subsequently be downloaded to device 108, their status flags reset, and/or access limitations to the emails may be removed.

Figure 6:
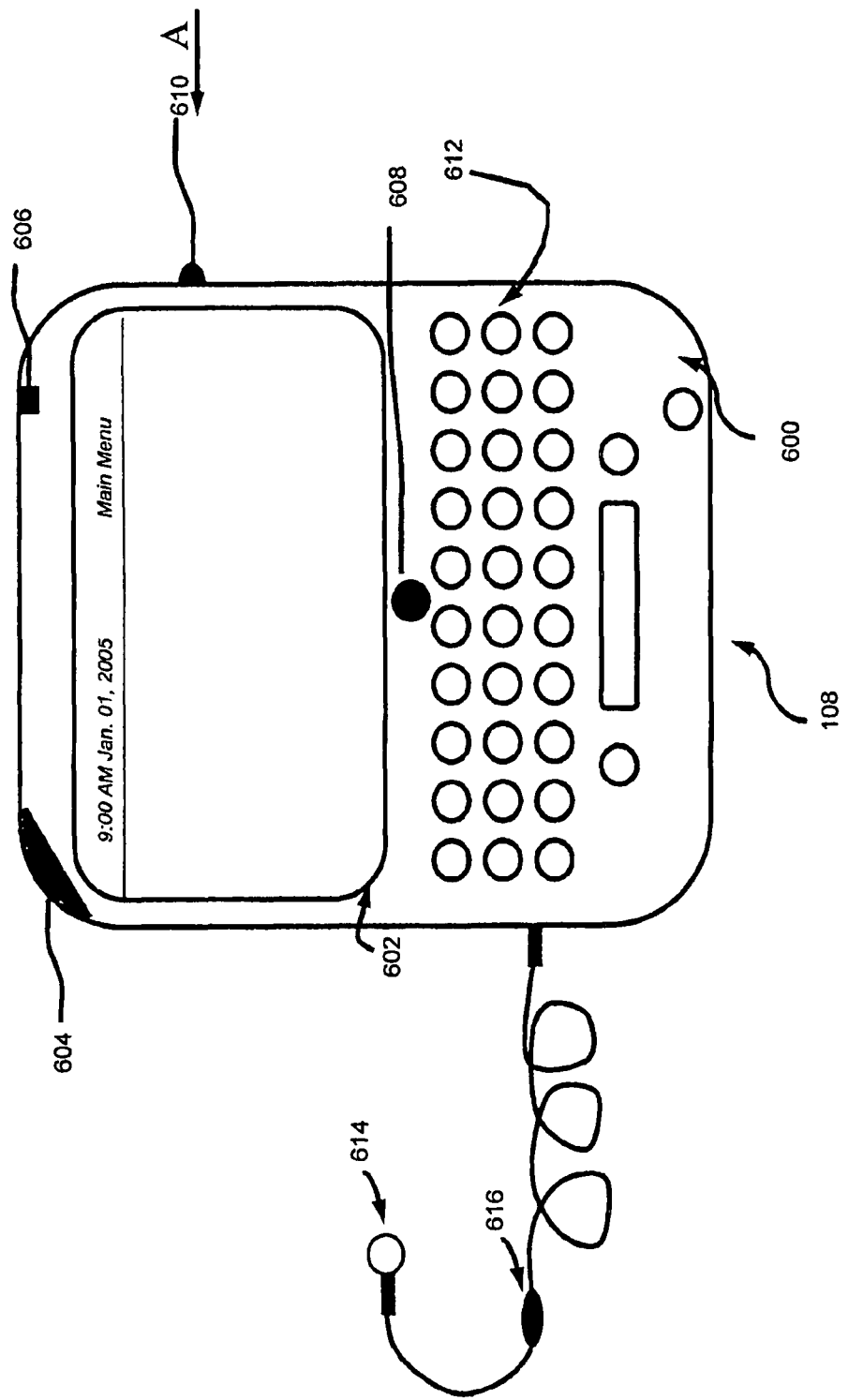
FIG. 6 is a schematic representation of the device of FIG. 1 in accordance with an embodiment.

With processes and GUIs related to an embodiment described, further detail is now provided on components of device 108 that are related to processes relating to an embodiment. Referring to FIG. 6, electronic device 108 is based on a computing platform having functionality of an enhanced personal digital assistant with cellphone and e-mail features. It is, however, to be understood that electronic device 108 can be based on construction design and functionality of other electronic devices, such as smart telephones, desktop computers, pagers or laptops having telephony equipment. In a present embodiment, electronic device 108 includes a housing 600, an LCD 602, speaker 604, an LED indicator 606, trackball 608, an ESC ("escape") key 610, keypad 612, a telephone headset comprised of an ear bud 614 and a microphone 616. Trackball 608 and ESC key 610 can be inwardly depressed as a means to provide additional input to device 108. ESC key 610 may be depressed along the path of arrow "A".

It will be understood that housing 600 can be made from any suitable material as will occur to those of skill in the art and may be suitably formed to house and hold all components of device 108.

Device 108 is operable to conduct wireless telephone calls, using any known wireless phone system such as a Global System for Mobile Communications (GSM) system, Code Division Multiple Access (CDMA) system, CDMA 2000 system, Cellular Digital Packet Data (CDPD) system and Time Division Multiple Access (TDMA) system. Other wireless phone systems can include Bluetooth and the many forms of 802.11 wireless broadband, like 802.11a, 802.11b, 802.11g, etc. that support voice. Other embodiments include Voice over IP (VoIP) type streaming data communications that can simulate circuit-switched phone calls. Ear bud 614 can be used to listen to phone calls and other sound messages and microphone 616 can be used to speak into and input sound messages to device 108.

Figure 7:
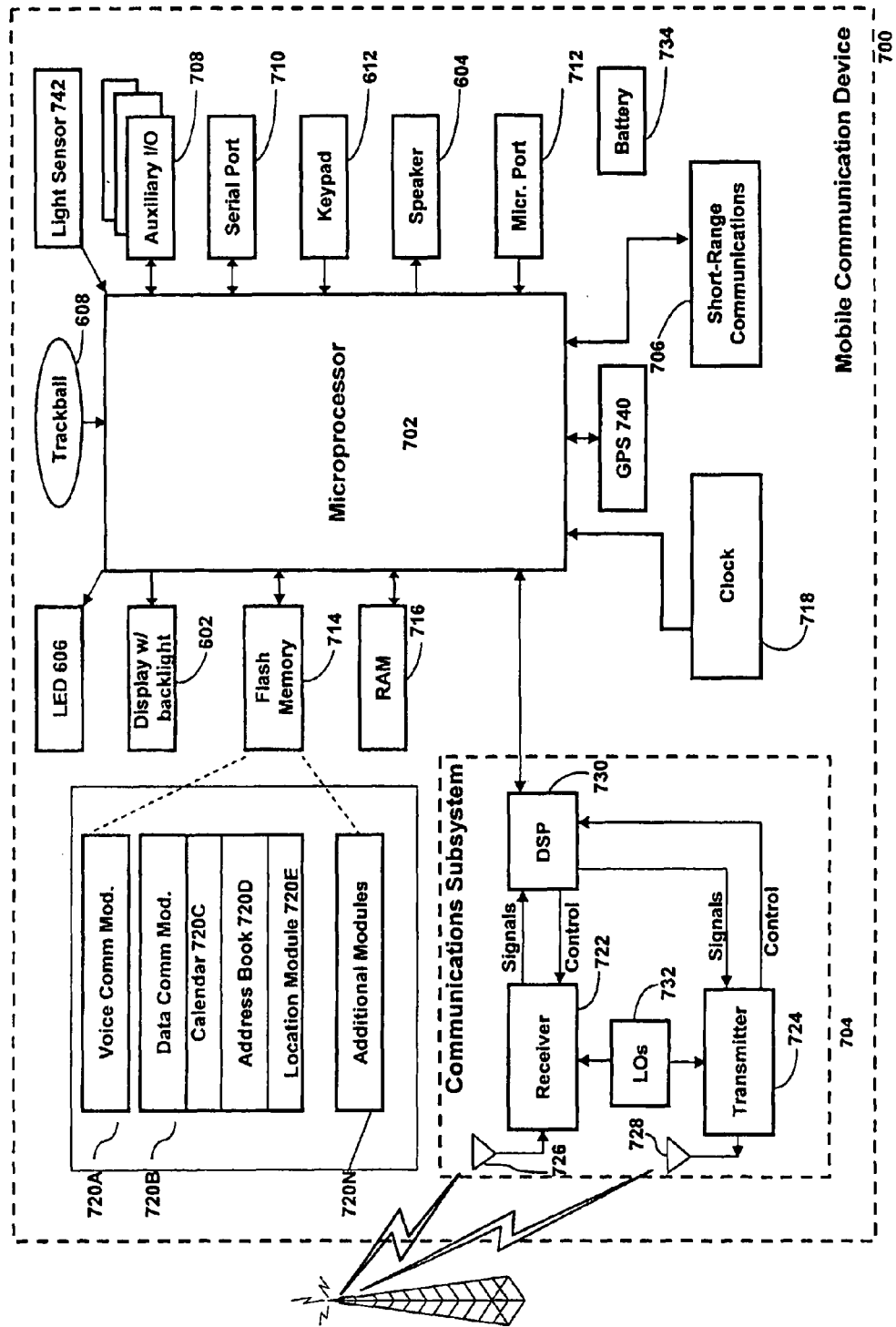
FIG. 7 is a block diagram of certain internal components of the device in FIG. 6.

Referring to FIG. 7, functional components of device 108 are provided in schematic 700. The functional components are generally electronic, structural or electro-mechanical devices. In particular, microprocessor 702 is provided to control and receive almost all data, transmissions, inputs and outputs related to device 108. Microprocessor 702 is shown schematically as coupled to keypad 612 and other internal devices. Microprocessor 702 preferably controls the overall operation of the device 108 and its components. Exemplary microprocessors for microprocessor 702 include microprocessors in the Data 950 (trademark) series, the 6200 series and the PXA900 series, all available at one time from Intel Corporation. Microprocessor 702 is connected to other elements in device 108 through a series of electrical connections to its various input and output pins. Microprocessor 702 has an IRQ input line which allows it to receive signals from various devices. Appropriate interrupt firmware is provided which receives and reacts to the signals detected on the IRQ line.

In addition to the microprocessor 702, other internal devices of the device 108 are shown schematically in FIG. 7. These include: display 602; speaker 604; keypad 612; communication sub-system 704; short-range communication sub-system 706; auxiliary I/O devices 708; serial port 710; microphone port 712 for microphone 616; flash memory 714 (which provides persistent storage of data including local data relating to the status flags used by an embodiment); random access memory (RAM) 716; clock 718 and other device sub-systems (not shown). Device 108 is preferably a two-way radio frequency (RF) communication device having voice and data communication capabilities. In addition, device 108 preferably has the capability to communicate with other computer systems via the Internet. Device 108 may have a SIM card (not shown).

Operating system software executed by the microprocessor 702 is preferably stored in a computer-readable medium, such as flash memory 714, but may be stored in other types of memory devices, such as read-only memory (ROM) or similar storage element. In addition, system software, specific device applications, or parts thereof, may be temporarily loaded into a volatile store, such as RAM 716. Communication signals received by the mobile device may also be stored to RAM 716.

Microprocessor 702, in addition to its operating system functions, enables execution of software applications on device 108. A set of software (or firmware) applications, generally identified as applications 720, that control basic device operations, such as voice communication module 720A and data communication module 720B, may be installed on the device 108 during manufacture or downloaded thereafter. As well, additional software modules, such as software module 720N, which may be for instance a personal information manager (PIM) application, may be installed during manufacture or downloaded thereafter into device 108. Data associated with each application can be stored in flash memory 714.

Data communication module 720B may comprise processes that implement features, processes and applications for device 108 as provided and described in FIGS. 3A-3C and 5 (and their variants described herein), allowing device 108 to generate track any status flags and generate notification screens when a service request to an expired account is initiated.

Communication functions, including data and voice communications, are performed through the communication sub-system 704 and the short-range communication sub-system 706. Collectively, sub-systems 704 and 706 provide the signal-level interface for all communication technologies processed by device 108. Various applications 720 provide the operational controls to further process and log the communications. Communication sub-system 704 includes receiver 722, transmitter 724 and one or more antennas, illustrated as receive antenna 726 and transmit antenna 728. In addition, communication sub-system 704 also includes processing modules, such as digital signal processor (DSP) 730 and local oscillators (LOs) 732. The specific design and implementation of communication sub-system 704 is dependent upon the communication network in which device 108 is intended to operate. For example, communication sub-system 704 of device 108 may operate with the Mobitex (trade-mark), DataTAC (trade-mark) or General Packet Radio Service (GPRS) mobile data communication networks and also operate with any of a variety of voice communication networks, such as Advanced Mobile Phone Service (AMPS), Time Division Multiple Access (TDMA), Code Division Multiple Access (CDMA), CDMA 2000, Personal Communication Service (PCS), Global System for Mobile Communication (GSM), etc. Other types of data and voice (telephonic) networks, both separate and integrated, may also be utilized with device 108. In any event, communication sub-system 704 provides device 108 with the capability of communicating with other devices using various communication technologies, including instant messaging (IM) systems, text messaging (TM) systems and short message service (SMS) systems.

In addition to processing communication signals, DSP 730 provides control of receiver 722 and transmitter 724. For example, gains applied to communication signals in receiver 722 and transmitter 724 may be adaptively controlled through automatic gain-control algorithms implemented in DSP 730.

In a data communication mode, a received signal, such as a text message or Web page download, is processed by the communication sub-system 704 and is provided as an input to microprocessor 702. The received signal is then further processed by microprocessor 702 which can then generate an output to display 602 or to an auxiliary I/O device 708. A device user may also compose data items, such as e-mail messages, using keypad 612, trackball 608 and/or some other auxiliary I/O device 708, such as a touchpad, a rocker switch or some other input device. The composed data items may then be transmitted over communication network 110 via communication sub-system 704. Sub-system 704 may also detect when it is out of communication range for its remote systems.

In a voice communication mode, overall operation of device 108 is substantially similar to the data communication mode, except that received signals are output to speaker 604, and signals for transmission are generated by microphone

616. Alternative voice or audio I/O sub-systems, such as a voice message recording sub-system, may also be implemented on device 108. In addition, display 602 may also be utilized in voice communication mode, for example, to display the identity of a calling party, the duration of a voice call, or other voice call-related information.

Short-range communication sub-system 706 enables communication between device 104 and other proximate systems or devices, which need not necessarily be similar devices. For example, the short-range communication sub-system may include an infrared device and associated circuits and components, or a Bluetooth (trade-mark) communication module to provide for communication with similarly enabled systems and devices.

Powering the entire electronics of the mobile handheld communication device is power source 734. In one embodiment, the power source 734 includes one or more batteries. In another embodiment, the power source 734 is a single battery pack, especially a rechargeable battery pack. A power switch (not shown) provides an "on/off" switch for device 108. A power source interface (not shown) may be provided in hardware, firmware, software or a combination of such elements to selectively control access of components in device 108 to power source 734. Upon activation of the power switch an application 720 is initiated to turn on device 108. Upon deactivation of the power switch, an application 720 is initiated to turn off device 108. Power to device 108 may also be controlled by other devices and by software applications 720. Other components in device 108 include GPS module 740 and light sensor 742.

The embodiments have been described for systems implementing an email communication system. However, it will be appreciated that other embodiments may implement the features in any communication protocol or system including email, messaging, text messages, telephone calls, cellular call and other communication platforms where a communication is being composed or sent and it is useful to obtain information about related inbound communications as they arrive, especially when they relate to the outbound communication. It will be appreciated that any features of email interface server as described herein may be incorporated into an email server and/or an interface server. It will be appreciated that any features relating to processing and displaying of an email (or part thereof) as described herein relating to a device may be incorporated into an email interface server.

It will be appreciated that the embodiments relating to devices, servers and systems may be implemented in a combination of electronic hardware, firmware and software. The firmware and software may be implemented as a series of processes and/or modules that provide the functionalities described herein. Interrupt routines may be used. Data may be stored in volatile and non-volatile devices described herein and be updated by the hardware, firmware and/or software. Other network embodiments may use non-client server architectures for management of communications.

It will further be appreciated that if one service is restricted for an account, other services may or may not be restricted as well. Alternatively or additionally, if access to one account is restricted then other restrictions may be imposed on other accounts or parts thereof. It will further be appreciated that embodiments may restrict use of other forms of communications, such as SMS messages, text messages, voice messages or other forms of communications depending on the status of any particular account.

The present disclosure is defined by the claims appended hereto, with the foregoing description being merely illustrative of embodiments of the present disclosure. Those of ordinary skill may envisage certain modifications to the foregoing embodiments which, although not explicitly discussed herein, do not depart from the scope of the present disclosure, as defined by the appended claims.

The invention claimed is:

1. A method comprising:
   monitoring a status of an account associated with an electronic communication device;
   when the status of the account indicates that the account is inactive:
   providing a notification to the electronic communication device that the account is inactive;
   providing at least one option to reactivate the account; and
   providing a part of a service of the account to the electronic communication device, including providing an indication of a received message;
   and when the status of the account is inactive, access is provided to the electronic communication device to emails associated with the account received prior to inactivation of the account.

2. The method of claim 1, wherein the at least one option to reactivate the account is provided in the notification.

3. The method of claim 1, wherein, upon receipt of selection of the option to reactivate the account from the electronic communication device, providing a request to reactivate the account.

4. The method of claim 1, wherein, while the account is inactive, a further service associated with the account is made accessible to the electronic communication device.

5. The method of 1, wherein the service provides access to an internet site.

6. The method of claim 1, wherein while the account is inactive, access to a further service associated with the account is provided to the electronic communication device.

7. The method of claim 1, wherein the at least one option to reactivate the account is provided at least one of in relation to a request for an email associated with the account and through a message displayed on the electronic communication device.

8. The method of claim 1, further comprising determining, by the electronic communication device, a level of access to the emails by evaluating a flag.

9. The method of claim 1, wherein:
   the status of the account is provided in a global flag that is provided to the electronic communication device; and
   the electronic communication device evaluates the global flag to determine a level of access to the received email by the electronic communication device.

10. The method of claim 1, wherein emails relating to the account are provided to the electronic communication device automatically from an email interface server.

11. The method of claim 1, wherein emails relating to the account are provided to the electronic communication device from an email interface server after a request is initiated from the electronic communication device.

12. The method of claim 1, wherein the received message is any of an email, an SMS message, a text message, and a voice message.

13. The method of claim 1, further comprising:
   receiving a request to reactivate the account from the electronic communication device; and
   reactivating the account.

14. A method comprising:
   monitoring a status of an account associated with an electronic communication device:
   when the status of the account indicates that the account is inactive:

providing a notification to the electronic communication device that the account is inactive;
providing at least one option to reactivate the account; and
providing a part of a service of the account to the electronic communication device, including providing an indication of a received message, and while the account is inactive:
emails relating to the account continue to be sent to the electronic communication device; and
emails that are received while the account is inactive have limited access privileges when accessed through the electronic communication device.

15. The method of claim 14, wherein the at least one option to reactivate the account is provided in the notification.

16. The method of claim 14, wherein, upon receipt of selection of the option to reactivate the account from the electronic communication device, providing a request to reactivate the account.

17. The method of claim 14, wherein, while the account is inactive, a further service associated with the account is made accessible to the electronic communication device.

18. The method of claim 14, wherein the service provides access to an internet site.

19. The method of claim 14, wherein while the account is inactive, access to a further service associated with the account is provided to the electronic communication device.

20. The method of claim 14, wherein the at least one option to reactivate the account is provided at least one of in relation to a request for an email associated with the account and through a message displayed on the electronic communication device.

21. The method of claim 14, further comprising determining, by the electronic communication device, a level of access to the emails by evaluating a flag.

22. The method of claim 14, wherein:
the status of the account is provided in a global flag that is provided to the electronic communication device; and
the electronic communication device evaluates the global flag to determine a level of access to the received email by the electronic communication device.

23. The method of claim 14, wherein emails relating to the account are provided to the electronic communication device automatically from an email interface server.

24. The method of claim 14, wherein emails relating to the account are provided to the electronic communication device from an email interface server after a request is initiated from the electronic communication device.

25. The method of claim 14, wherein the received message is any of an email, an SMS message, a text message, and a voice message.

26. The method of claim 14, further comprising:
receiving a request to reactivate the account from the electronic communication device; and
reactivating the account.

27. A method comprising:
monitoring a status of an account for a communication device, wherein the account includes email;
when the status of the account indicates that the account is inactive:
providing a notification that the account is inactive;
providing at least one option to reactivate the account;
providing emails relating to the account to the communication device, wherein the emails have limited access privileges when accessed through the communication device.

28. The method of claim 27, further comprising:
receiving a request to reactivate the account from the communication device;
reactivating the account.

* * * * *

UNITED STATES PATENT AND TRADEMARK OFFICE
CERTIFICATE OF CORRECTION

| | | |
|---|---|---|
| PATENT NO. | : 9,344,298 B2 | |
| APPLICATION NO. | : 11/944446 | |
| DATED | : May 17, 2016 | |
| INVENTOR(S) | : Rito Natale Costanzo et al. | |

It is certified that error appears in the above-identified patent and that said Letters Patent is hereby corrected as shown below:

In the claims,

Column 18, Line 31, In Claim 5, after "method of" insert -- claim --.

Column 18, Line 65, In Claim 14, after "communication" delete "device:" and insert -- device; --, therefor.

Signed and Sealed this
Twenty-sixth Day of July, 2016

Michelle K. Lee
*Director of the United States Patent and Trademark Office*